(12) United States Patent
Agano

(10) Patent No.: US 6,469,312 B2
(45) Date of Patent: Oct. 22, 2002

(54) ENERGETIC-BEAM DETECTION APPARATUS INCLUDING TEMPERATURE-CONTROLLED SELENIUM DETECTOR

(75) Inventor: Toshitaka Agano, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 30 days.

(21) Appl. No.: 09/822,210

(22) Filed: Apr. 2, 2001

(65) Prior Publication Data

US 2001/0025934 A1 Oct. 4, 2001

(30) Foreign Application Priority Data

Mar. 31, 2000 (JP) .......................... 2000-098724

(51) Int. Cl.$^7$ ................................. G01T 1/16
(52) U.S. Cl. ................. 250/580; 250/591; 250/484.4; 250/370.01; 250/370.09
(58) Field of Search ................. 250/580, 584, 250/585, 591, 484.4, 370.08, 370.09, 370.01

(56) References Cited

U.S. PATENT DOCUMENTS

| | | | |
|---|---|---|---|
| 4,176,275 A | 11/1979 | Korn et al. | 250/213 |
| 4,535,468 A | 8/1985 | Kempter | 378/31 |
| 4,961,209 A | 10/1990 | Rowlands et al. | 378/29 |
| 5,103,092 A * | 4/1992 | Takahashi et al. | 250/252.1 |
| 5,107,482 A * | 4/1992 | Goto et al. | 369/100 |
| 5,132,627 A * | 7/1992 | Popovic et al. | 324/452 |
| 5,268,569 A | 12/1993 | Nelson et al. | 250/214 |
| 5,354,982 A | 10/1994 | Nelson et al. | 250/214 |
| 5,432,354 A * | 7/1995 | Ohara | 250/484.4 |
| 5,925,890 A | 7/1999 | Van den Bogaert et al. | 250/580 |
| 6,268,614 B1 * | 7/2001 | Imai | 250/591 |
| 6,304,362 B1 * | 10/2001 | Zheludev et al. | 359/241 |
| 6,319,321 B1 * | 11/2001 | Hiraga et al. | 118/50.1 |

FOREIGN PATENT DOCUMENTS

| | | | |
|---|---|---|---|
| EP | 0898 421 A2 | 2/1999 | H04N/5/30 |
| JP | 9-5906 | 1/1997 | G03B/42/02 |
| JP | 2000-105297 | 4/2000 | G21K/4/00 |
| JP | 2000-137080 | 5/2000 | G01T/1/20 |

OTHER PUBLICATIONS

Abstract 2000–137080 May 16, 2000.
Research Disclosure No. 23027, Jun. 1983.
Medical Physics, Dec. 1995, vol. 22, No. 12.

* cited by examiner

Primary Examiner—Constantine Hannaher
Assistant Examiner—Albert Gagliardi
(74) Attorney, Agent, or Firm—Sughrue Mion, PLLC (57) ABSTRACT

In an energetic-beam detection apparatus having a selenium detector which includes a substrate and an energetic-beam absorber being formed on the substrate and containing selenium, a temperature detecting unit detects a temperature of the selenium detector, and a temperature control unit controls the temperature of the selenium detector so that the temperature is maintained in a predetermined range when the selenium detector is in operation. Alternatively, when the temperature of the selenium detector is outside a predetermined range, an operation suppressing unit suppresses the operation of the selenium detector, or a notification unit notifies a user of the deviation of the temperature of the selenium detector from the predetermined range.

23 Claims, 5 Drawing Sheets

ENERGETIC-BEAM DETECTION APPARATUS INCLUDING TEMPERATURE-CONTROLLED SELENIUM DETECTOR

CROSS-REFERENCE TO RELATED APPLICATIONS

The subject matters disclosed in this specification are related to the subject matters disclosed in the following copending, commonly-assigned U.S. patent applications:

(1) U.S. Ser. No. 09/136,739 filed by Shinji Imai on Aug. 19, 1998, now U.S. Pat. No. 6,268,614 and entitled "ELECTROSTATIC RECORDING MEMBER, ELECTROSTATIC LATENT IMAGE RECORDING APPARATUS, AND ELECTROSTATIC LATENT IMAGE READ-OUT APPARATUS," corresponding to Japanese patent application No. 10-232824, which is disclosed in Japanese Unexamined Patent Publication No. 2000-105297; and (2) U.S. Ser. No. 09/385,443 filed by Satoshi Arakawa on Aug. 30, 1999 and entitled "RADIATION IMAGE DETECTING SYSTEM," corresponding to Japanese patent application No. 10-243379, which is disclosed in Japanese Unexamined Patent Publication No. 2000-137080.

The contents of the above copending, commonly-assigned U.S. patent applications and the corresponding Japanese patent applications are incorporated in this specification by reference.

BACKGROUND OF THE INVENTION

1. Field of the Invention

The present invention relates to an energetic-beam detection apparatus which absorbs an energetic beam by using an energetic-beam absorber made of selenium, where the energetic beam may be a beam of light, X rays, gamma rays, any other electromagnetic waves having shorter or longer wavelengths, and energetic particles.

2. Description of the Related Art

In various systems which have been proposed or used, an energetic-beam detection apparatus including a selenium detector is used, where the selenium detector is made of selenium as an energetic-beam absorber which is sensitive to energetic beams. In the field of medical radiography, radiographic image readout systems using an energetic-beam detection apparatus which can efficiently detect radiation have been proposed in order to decrease radiation doses to which patients are exposed, and improve performance in diagnosis. In the above radiographic image readout systems, charges having an amount corresponding to the intensity of radiation which has passed through a subject (patient) is stored as latent-image charges in a photoconductive layer in a solid-state radiation detector so that a radiographic image is recorded, where the solid-state radiation detector is a kind of selenium detector. There are two methods of reading out an image signal which represents the amount of the latent-image charges, the TFT readout method and the optical readout method.

Since the above photoconductive layer exhibits conductivity when the photoconductive layer is exposed to radiation such as X rays, the photoconductive layer is also called an X-ray photoconductive layer. However, in this specification, the term "photoconductive layer" is used in its broadest sense, i.e., the term "photoconductive layer" covers any photoconductive layers which exhibit conductivity when the photoconductive layers are exposed to light, X rays, gamma rays, or any other electromagnetic radiation having a shorter or longer wavelength.

According to the TFT readout method, TFTs (thin-film transistors) are scanned and activated, the latent-image charges stored in the photoconductive layer is converted into a radiographic image signal, which is then output. For example, the coassigned U.S. patent application Ser. No. 09/385,443 corresponding to Japanese Unexamined Patent Publication No. 2000-137080 discloses a solid-state radiation detector which is constructed by forming a first electrode, a photoconductive layer, a plurality of charge collecting electrodes, a capacitor array, a TFT array, and a second electrode in this order on a fluorescent layer. In the solid-state radiation detector, the fluorescent layer emits visible light when the fluorescent layer is exposed to radiation. The first electrode is transparent to the radiation and the visible light. The photoconductive layer contains a-Se (amorphous selenium) as a main component, and has a thickness of about 400 micrometers. The plurality of charge collecting electrodes respectively correspond to pixels, and are arranged in the form of a matrix with a predetermined pitch on an insulator substrate being made of quartz glass and having a thickness of 3 mm. The capacitor array includes a plurality of capacitors each of which stores as latent-image charges signal charges collected by a corresponding one of the plurality of charge collecting electrodes. The TFT array includes a plurality of TFTs, each of which transfers the latent-image charges stored in a corresponding one of the plurality of capacitors to a detection circuit. For example, the fluorescent layer contains $Gd_2O_2S$:Tb as a main component, and has a thickness of about 100 micrometers. It is preferable to arrange the fluorescent layer in contact with or in the vicinity of the first electrode. The photoconductive layer generates charges when the photoconductive layer is exposed to the above visible light as well as the above radiation which carries image information.

When the fluorescent layer is exposed to the radiation which carries image information, a portion of the radiation is converted into visible light in the fluorescent layer. The remaining portion of the radiation and the visible light converted from the radiation enter the photoconductive layer through the first electrode. Since the photoconductive layer generates charges when the photoconductive layer is exposed to either of visible light and radiation, charges corresponding to the image information carried by the visible light and the remaining portion of the radiation are generated in the photoconductive layer when the visible light and the remaining portion of the radiation enter the photoconductive layer. Then, the generated charges are read out through the TFTs. The above solid-state radiation detector is advantageous in that a high-quality radiographic image can be obtained. Since the photoconductive layer in the above solid-state radiation detector contains a-Se as a main component, the solid-state radiation detector can be regarded as selenium detector.

On the other hand, according to the optical readout method, the latent-image charges stored in the photoconductive layer are converted into an image signal by applying reading light to the solid-state radiation detector, and then the image signal is read out. For example, the optical readout method is disclosed in U.S. Pat. Nos. 4,176,275, 5,268,569, 5,354,982, 4,535,468, and 4,961,209, Research Disclosure No. 23027, June 1983 ("Method and device for recording and transducing an electromagnetic energy pattern"), Japanese Unexamined Patent Publication No. 9(1997)-5906, and Medical Physics, Vol. 22, No. 12 ("X-ray imaging using amorphous selenium").

For example, U.S. Pat. No. 4,535,468 discloses a solid-state radiation detector which is constructed by forming a recording-side photoconductive layer, an intermediate layer (trap later), a reading-side photoconductive layer, and a reading-side electrode layer in this order on a recording-side electrode layer. The recording-side electrode layer is relatively thick (2 mm thick) and made of aluminum, and behaves as a conductive substrate which is transparent to a recording electromagnetic radiation (hereinafter called recording light). The recording-side photoconductive layer contains a-Se (amorphous selenium) as a main component, and has a thickness of 100 to 500 micrometers. The intermediate layer (trap later) is made of $AsS_4$, $As_2S3$, $As_2Se_3$, or the like, and has a thickness of 0.01 to 10.0 micrometers. Latent-image charges generated in the recording-side photoconductive layer are trapped and stored in the intermediate layer (trap later). The reading-side photoconductive layer contains a-Se (amorphous selenium) as a main component, and has a thickness of 0.5 to 100 micrometers. The reading-side electrode layer is made of gold or ITO (indium tin oxide), has a thickness of 100 nm, and behaves as a conductive substrate which is transparent to a reading electromagnetic radiation (hereinafter called reading light). The above solid-state radiation detector is advantageous in that the dark resistance and the response speed in reading are high. Since the recording-side and reading-side photoconductive layers in the above solid-state radiation detector contain a-Se as a main component, the solid-state radiation detector can also be regarded as selenium detector.

In order to increase the S/N ratio, and decrease the readout time by parallel reading from pixels arranged in the main scanning direction, the reading-side electrode layers in some solid-state radiation detectors include a striped electrode array comprised of a number of elements (linear electrodes) arranged at a pixel pitch, for example, as disclosed in the coassigned U.S. patent application Ser. No. 09/136,739, U.S. Pat. No. 6,268,614 and Japanese Unexamined Patent Publication No. 2000-105297. However, when layers which constitute the solid-state radiation detector disclosed in U.S. Pat. No. 4,535,468 are formed, the recording-side electrode layer must be formed in the final stage of the manufacturing process, i.e., after the reading-side photoconductive layer is formed. It is difficult to form the striped electrode array in the above solid-state radiation detector for the following reason. When the striped electrode array is formed by lithography, a photoetching process, which is used in the manufacture of the semiconductor, is necessary. However, the photoetching process usually includes a high-temperature process such as the process of baking photoresist (e.g., at the temperature of 200° C.), and the a-Se which constitutes the photoconductive layers cannot withstand such a high temperature. Therefore, the characteristics of the photoconductive layers deteriorate during the photoetching process.

In addition, since the alkali developer solution used in the process of developing the photoresist generates harmful gas on contact with the a-Se, special provision for elimination of the harmful gas increases the complexity of the manufacturing process and the manufacturing cost.

The coassigned U.S. patent application Ser. No. 09/136,739, U.S. Pat. No. 6,268,614 corresponding to Japanese Unexamined Patent Publication No. 2000-105297 proposes a solid-state radiation detector which is constructed by forming a recording-side electrode layer, a recording-side photoconductive layer, a charge transport layer, a reading-side photoconductive layer, and a reading-side electrode layer in this order. The recording-side electrode layer includes a $SnO_2$ film (i.e., the so-called NESA film) which is transparent to radiation as recording light. The recording-side photoconductive layer contains a-Se as a main component. The charge transport layer is made of, for example, a-Se doped with an organic substance or chlorine of 10 to 200 ppm, and forms a charge storage region at the interface with the recording-side photoconductive layer so that latent-image charges generated in the recording-side photoconductive layer are stored in the charge storage region. The reading-side photoconductive layer contains a-Se as a main component. The reading-side electrode layer is transparent to reading light.

Generally, the layers which constitute the above solid-state radiation detector can be formed in either the above-mentioned order or the reverse order. However, specifically, the coassigned U.S. patent application Ser. No. 09/136,739, U.S. Pat. No. 6,268,614 corresponding to Japanese Unexamined Patent Publication No. 2000-105297 proposes that the reading-side electrode layer includes a striped electrode array (or a comb electrode) formed on a transparent glass substrate (as a support) with a conductive substance such as the NESA film, and is used as a positive electrode, where the striped electrode array (or comb electrode) is comprised of a number of stripe electrodes (or teeth electrodes) arranged at a very small pixel pitch. That is, the number of stripe electrodes (or teeth electrodes) must be formed at a sufficiently small pitch by using the semiconductor processing technique. Therefore, in this case, the above striped electrode array or comb electrode is required to be firstly formed on the transparent glass substrate by photoetching or the like, and thereafter the other layers are formed over the striped electrode array (or comb electrode). In addition, in order to achieve high sharpness and S/N ratio in medical radiography, the pixel pitch of 50 to 200 micrometers is required.

On the other hand, the inventor of the present application found that a very fine stripe pattern can be produced at a low cost when a relatively thin (50 to 200 nm thick) ITO film is formed on the transparent glass substrate before forming the above striped electrode array in the reading-side electrode layer.

As described above, the solid-state radiation detector disclosed in the coassigned U.S. patent application Ser. No. 09/136,739, U.S. Pat. No. 6,268,614 and Japanese Unexamined Patent Publication No. 2000-105297 is advantageous in that the dark resistance and the response speed in reading are high. In addition, since two layers which contain a-Se as a main component, i.e., the recording-side and reading-side photoconductive layers, are used energetic-beam absorbers, this solid-state radiation detector can also be regarded as a selenium detector. In addition, the glass substrate is, for example, a Corning 1737 glass plate having a thickness of 1.1 mm. In this case, the effective medium size is 20×20 cm or greater. In particular, the effective medium size for breast X-ray imaging is 43×43 cm.

However, when the above-mentioned selenium detectors (solid-state radiation detectors) are used for a long time in a high-temperature environment, the temperature of the solid-state radiation detectors increases. On the other hand, in cold climates, the selenium detectors may be placed in a low-temperature environment, for example, during storage.

Generally, the dark resistance characteristics of amorphous selenium films tend to deteriorate over time even under normal use. This is because the so-called bulk crystallization develops over time. Therefore, the practical lifetimes of the selenium detectors are limited. In particular, the bulk crystallization is accelerated when the temperature exceeds 45° C. Further, when the temperature exceeds 50° C., the selenium films are softened, and the practical lifetimes can be seriously reduced.

Furthermore, the coassigned U.S. patent application Ser. No. 09/136,739, U.S. Pat. No. 6,268,614 and Japanese Unexamined Patent Publication No. 2000-105297 also disclose a selenium detector in which a selenium multilayer film as a photoconductive layer is formed on a glass substrate. In this selenium detector, great thermal stress is produced at the boundary between the glass substrate and the selenium multilayer film due to the difference (by about an order of magnitude) in the thermal expansion coefficient at low temperature between the glass substrate and the selenium multilayer film, and the selenium multilayer film is likely to be separated from the glass substrate by exfoliation. In particular, when the operation of the selenium detector is suddenly started in a situation in which thermal stress is caused at the boundary between the glass substrate and the selenium multilayer film by low temperature, and the selenium multilayer film is not yet separated from the glass substrate by exfoliation, exfoliation of the selenium multilayer film is likely to occur since a temperature difference between the selenium multilayer film and the glass substrate is caused by the start of the operation.

SUMMARY OF THE INVENTION

An object of the present invention is to provide a method for controlling temperature in an energetic-beam detection apparatus including a selenium detector comprised of a substrate and an energetic-beam absorber which is formed on the substrate and contains selenium, whereby the temperature is controlled so as to suppress decrease in the practical lifetime of a selenium detector due to softening or development of bulk crystallization of selenium in a high-temperature environment, and prevent exfoliation of the energetic-beam absorber from the substrate due to thermal stress caused by operation in a low-temperature environment.

Another object of the present invention is to provide an energetic-beam detection apparatus including a selenium detector comprised of a substrate and an energetic-beam absorber which is formed on the substrate and contains selenium, wherein decrease in the practical lifetime of a selenium detector due to softening or development of bulk crystallization of selenium in a high-temperature environment can be suppressed, and exfoliation of the energetic-beam absorber from the substrate due to thermal stress caused by operation in a low-temperature environment can be prevented.

(1) According to the first aspect of the present invention, there is provided a method for controlling temperature in an energetic-beam detection apparatus including a selenium detector which includes a substrate and an energetic-beam absorber being formed on the substrate and containing selenium. The method comprises the steps of: (a) detecting a temperature of the selenium detector; and (b) controlling the temperature of the selenium detector so that the temperature is maintained in a range of 0° C. to 50° C. when the selenium detector is in operation.

Preferably, the method according to the first aspect of the present invention also has one or any possible combination of the following additional features (i) and (ii).

(i) In the step (b), the temperature may be maintained in a range of 10° C. to 45° C. when the selenium detector is in operation.

(ii) In the step (b), the temperature may be maintained in a range of 30° C. to 40° C. when the selenium detector is in operation.

Since the temperature of the selenium detector can be maintained in the range of 0° C. to 50° C. when the selenium detector is in operation, it is possible to prevent serious decrease in the practical lifetime of the selenium detector due to softening or development of bulk crystallization of selenium in a high-temperature environment, and exfoliation of the energetic-beam absorber from the substrate due to thermal stress caused by operation in a low-temperature environment. Further, when the temperature of the selenium detector is maintained in the range of 30° C. to 40° C., the decrease in the practical lifetime of the selenium detector can be further effectively suppressed, and the exfoliation of the energetic-beam absorber from the substrate can be further effectively prevented. In addition, when the temperature of the selenium detector is maintained in the range of 30° C. to 40° C., the energetic-beam detection apparatus can be used in a temperature range in which the detection sensitivity is high. Therefore, the detection sensitivity of the energetic-beam detection apparatus is improved.

(2) According to the second aspect of the present invention, there is provided an energetic-beam detection apparatus comprising: a selenium detector which includes a substrate and an energetic-beam absorber being formed on the substrate and containing selenium; a temperature detecting unit which detects a temperature of the selenium detector; and a temperature control unit which controls the temperature of the selenium detector so that the temperature is maintained in a predetermined range when the selenium detector is in operation.

Due to the provision of the temperature control unit, the temperature of the selenium detector can be maintained in the predetermined range when the selenium detector is in operation. Therefore, the decrease in the practical lifetime of the selenium detector due to softening or development of bulk crystallization of selenium in a high-temperature environment can be automatically suppressed, and the exfoliation of the energetic-beam absorber from the substrate due to thermal stress caused by operation in a low-temperature environment can be automatically prevented. Thus, users can continue to use the energetic-beam detection apparatus without being bothered with the temperature control of the selenium detector. That is, the usability of the energetic-beam detection apparatus is improved.

Preferably, the energetic-beam detection apparatus according to the second aspect of the present invention also has one or any possible combination of the following additional features (iii) to (v).

(iii) The predetermined range may be from 0° C. to 50° C.

(iv) The predetermined range may be from 10° C. to 45° C. In this case, the decrease in the practical lifetime of the selenium detector can be further effectively suppressed, and the exfoliation of the energetic-beam absorber from the substrate can be further effectively prevented.

(v) The energetic-beam absorber may be realized by a selenium multilayer film having a thickness of 150 to 1,500 micrometers, where the selenium multilayer film includes a plurality of selenium films. In this case, high detection sensitivity can be achieved in a wide energy range of energetic beams.

(3) According to the third aspect of the present invention, there is provided an energetic-beam detection apparatus comprising: a selenium detector which includes a substrate and an energetic-beam absorber being formed on the substrate and containing selenium; a temperature detecting unit which detects a temperature of the selenium detector; and an operation suppressing unit which suppresses the operation of the selenium detector when the temperature of the selenium detector is outside a predetermined range.

Since the operation suppressing unit suppresses the operation of the selenium detector when the temperature of the selenium detector is outside a predetermined range, the selenium detector can operate only when the temperature of the selenium detector is within the predetermined range. Thus, the decrease in the practical lifetime of the selenium detector due to softening or development of bulk crystallization of selenium in a high-temperature environment can be suppressed, and the exfoliation of the energetic-beam absorber from the substrate due to thermal stress caused by operation in a low-temperature environment can be prevented.

Preferably, the energetic-beam detection apparatus according to the third aspect of the present invention also has one or any possible combination of the aforementioned additional features (iii) to (v).

(4) According to the fourth aspect of the present invention, there is provided an energetic-beam detection apparatus comprising: a selenium detector which includes a substrate and an energetic-beam absorber being formed on the substrate and containing selenium; a temperature detecting unit which detects a temperature of the selenium detector; and a notification unit which notifies a user of deviation of the temperature of the selenium detector from a predetermined range when the temperature of the selenium detector is outside the predetermined range.

Since the notification unit notifies a user of deviation of the temperature of the selenium detector from a predetermined range when the temperature of the selenium detector is outside the predetermined range, the user can take appropriate measures to suppress the decrease in the practical lifetime of the selenium detector due to softening or development of bulk crystallization of selenium in a high-temperature environment, or prevent exfoliation of the energetic-beam absorber from the substrate due to thermal stress caused by operation in a low-temperature environment. When the deviation of the temperature of the selenium detector from the predetermined range is corrected by the above measures, the user can continuously use the energetic-beam detection apparatus without stopping the operation of the energetic-beam detection apparatus.

Preferably, the energetic-beam detection apparatus according to the fourth aspect of the present invention also has one or any possible combination of the aforementioned additional features (iii) to (v).

(5) According to the fifth aspect of the present invention, there is provided an energetic-beam detection apparatus comprising: a selenium detector which includes a substrate and an energetic-beam absorber being formed on the substrate and containing selenium; a temperature detecting unit which detects a temperature of the selenium detector; and a high-side temperature control unit which controls the temperature of the selenium detector so that the temperature is maintained equal to or below a predetermined upper limit.

Since the high-side temperature control unit controls the temperature of the selenium detector so that the temperature is maintained equal to or below a predetermined upper limit, the decrease in the practical lifetime of the selenium detector due to softening or development of bulk crystallization of selenium in a high-temperature environment can be automatically suppressed. Thus, even when the temperature of the selenium detector rises above the predetermined upper limit, users can continue to use the energetic-beam detection apparatus without being bothered with the temperature rise in the selenium detector. That is, the usability of the energetic-beam detection apparatus is improved.

Preferably, the energetic-beam detection apparatus according to the fifth aspect of the present invention also has one or any possible combination of the aforementioned additional features (v) and the following additional features (vi) to (xi).

(vi) The energetic-beam detection apparatus according to the fifth aspect of the present invention may further comprise a low-side temperature control unit which controls the temperature of the selenium detector so that the temperature is maintained equal to or above a predetermined lower limit. Since the low-side temperature control unit controls the temperature of the selenium detector so that the temperature is maintained equal to or above a predetermined lower limit, the exfoliation of the energetic-beam absorber from the substrate due to thermal stress caused by operation in a low-temperature environment can be automatically prevented. Thus, even when the temperature of the selenium detector drops below the predetermined lower limit, users can continue to use the energetic-beam detection apparatus without being bothered with the temperature drop in the selenium detector. That is, the usability of the energetic-beam detection apparatus is further improved. In addition, the energetic-beam detection apparatus can be used in a temperature range in which the detection sensitivity is high. Therefore, the detection sensitivity of the energetic-beam detection apparatus is improved.

(vii) The predetermined upper limit may be one of 40° C., 45° C., and 50° C.

(viii) In the energetic-beam detection apparatus according to the fifth aspect of the present invention having the feature (vi), the predetermined lower limit may be one of 0° C., 10° C., and 30° C.

(ix) In the energetic-beam detection apparatus according to the fifth aspect of the present invention having the feature (vi), the predetermined upper limit may be 40° C., and the predetermined lower limit may be 30° C. In this case, the energetic-beam detection apparatus can be used in a temperature range in which the detection sensitivity is high. Therefore, the detection sensitivity of the energetic-beam detection apparatus is improved.

(x) The high-side temperature control unit may comprise a cooling unit which cools the selenium detector. The cooling unit may be a mechanical cooling unit, such as a fan, which cools the selenium detector by blowing air. Alternatively, the cooling unit may be an electrical cooling unit such as a Peltier element. When the high-side temperature control unit comprises the cooling unit, the temperature of the selenium detector can be easily dropped to or below the predetermined upper limit.

(xi) In the energetic-beam detection apparatus according to the fifth aspect of the present invention having the feature (vi), the low-side temperature control unit may comprise a warming unit which warms the selenium detector. The warming unit may be a warm-air blower, heater, or the like. When the low-side temperature control unit comprises the warming unit, the temperature of the selenium detector can be easily raised to or above the predetermined lower limit.

In the first to fifth aspects of the present invention, the temperature of the selenium detector may be the temperature of the main body of the selenium detector or the temperature in the vicinity of the selenium detector.

DESCRIPTION OF PREFERRED EMBODIMENTS

Embodiments of the present invention are explained in detail below with reference to drawings.

First Embodiment

Figure 1:
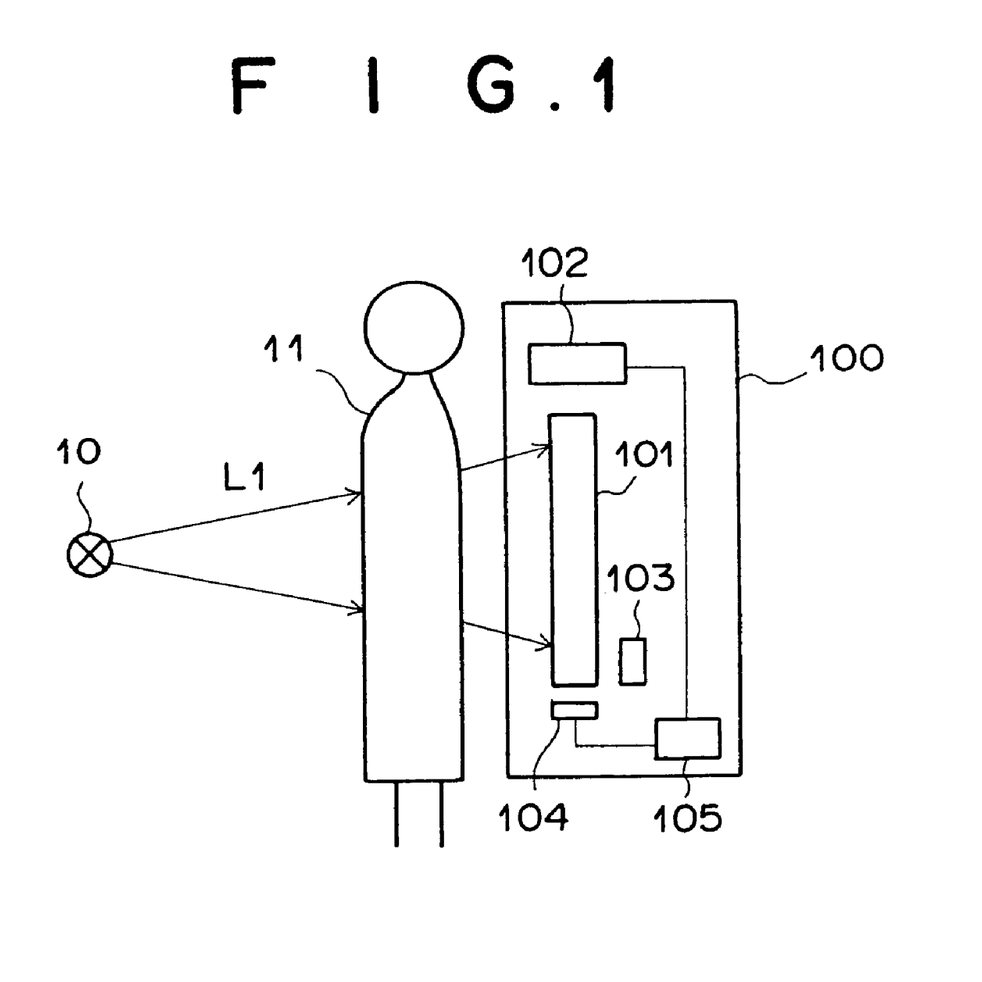
FIG. 1 is a diagram illustrating an outline of a radiographic-image pickup-and-readout system using an energetic-beam detection apparatus as a first embodiment of the present invention.

FIG. 1 is a diagram illustrating an outline of a radiographic-image pickup-and-readout system using an energetic-beam detection apparatus as the first embodiment of the present invention. The radiographic-image pickup and readout system of FIG. 1 comprises a radiation source 10 and a pickup-and-readout apparatus 100 as the energetic-beam detection apparatus. The pickup-and-readout apparatus 100 comprises a solid-state radiation detector 101, a current detection unit 102, an LED array 103, a thermistor 104, and a operation suppressing unit 105. The solid-state radiation detector 101 is a flat-panel type selenium detector. The current detection unit 102 reads out image information from the solid-state radiation detector 101 as a current value. The LED array 103 scans the solid-state radiation detector 101 with reading light for exposing the solid-state radiation detector 101 to the reading light. The thermistor 104 detects the temperature of the solid-state radiation detector 101.

Figure 2:
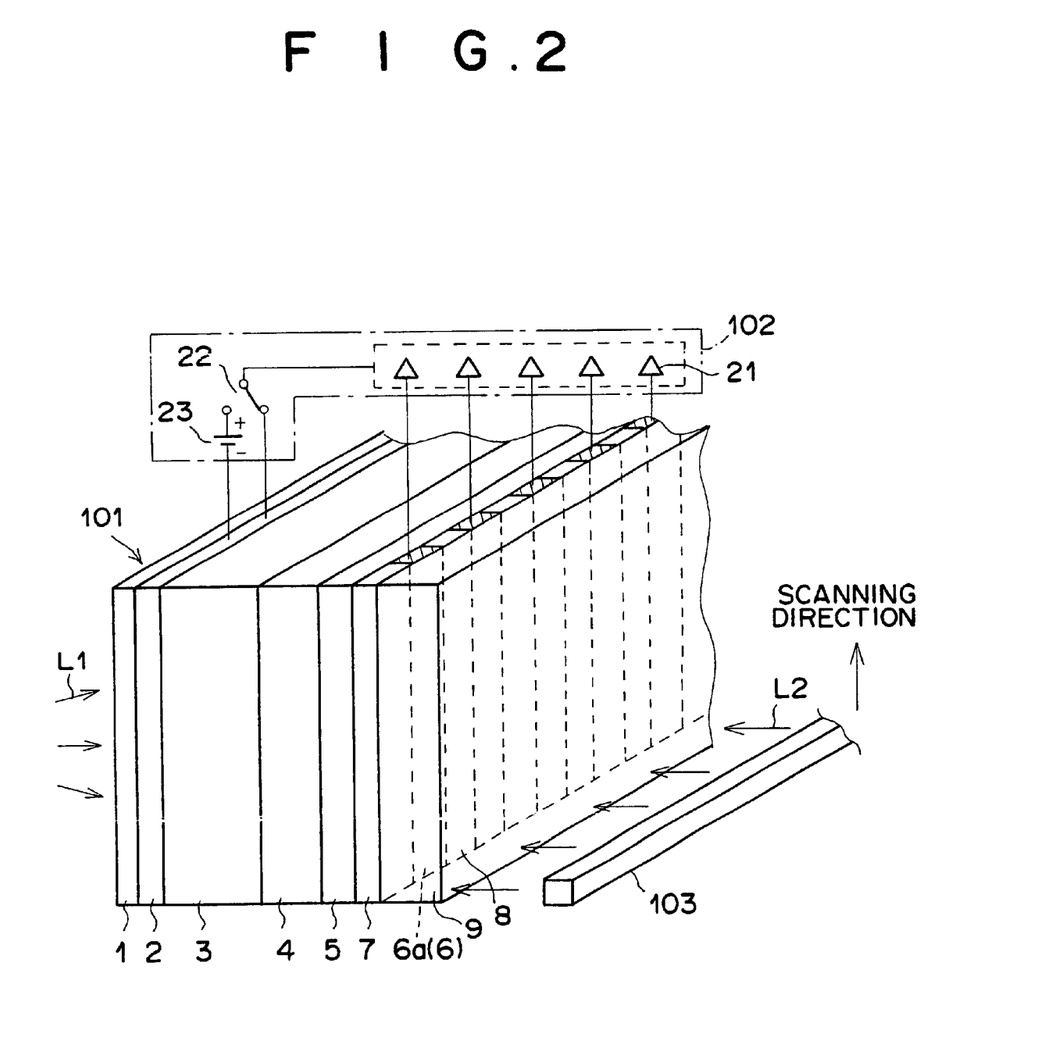
FIG. 2 is a diagram illustrating a portion of a pickup-and-readout apparatus in the radiographic-image pickup-and-readout system.

FIG. 2 is a diagram illustrating a portion of the pickup-and-readout apparatus 100, in which a portion of the solid-state radiation detector 101 and the LED array 103 are illustrated in perspective, and the current detection circuit 102 is illustrated in a simplified circuit representation. As illustrated in FIG. 2, the solid-state radiation detector 101 comprises a wavelength conversion layer 1, a first electrode layer 2, a recording-side photoconductive layer 3, a charge transport layer 4, a reading-side photoconductive layer 5, a second electrode layer 7, and a glass substrate 9, which are formed in this order. The wavelength conversion layer 1 converts recording light L1 into light (e.g., blue light) in a wavelength range which is different from the wavelength range of the recording light L1, where the recording light L1 is a radiation (e.g., X rays) used for recording image information, and the light (e.g., blue light) into which the recording light L1 is converted by the wavelength conversion layer 1 is hereinbelow called the converted light. When the wavelength conversion layer 1 coverts X rays into visible light, the wavelength conversion layer 1 is called an X-ray scintillator. The first electrode layer 2 is transparent to the converted light (e.g., blue light). The recording-side photoconductive layer 3 has a thickness of about 1,000 micrometers, and exhibits conductivity when exposed to the converted light (e.g., blue light) which has passed through the first electrode layer 2. The charge transport layer 4 behaves as almost an insulator against charge carriers having a latent-image polarity (i.e., a polarity which is identical to the polarity of latent-image charges stored in the first electrode layer 2), and behaves as almost a conductor of charge carriers having a transport polarity (i.e., a polarity opposite to the latent-image polarity). The reading-side photoconductive layer 5 exhibits conductivity when exposed to the reading light L2. A striped electrode array 6 comprised of a plurality of conductive elements 6a is formed in the second electrode layer 7, where the plurality of conductive elements are arranged to form a stripe pattern, and each provided for detecting charges. The spaces 8 between the plurality of conductive elements 6a in the second electrode layer 7 are filled with an insulating material which is transparent to the reading light L2. The thickness of the solid-state radiation detector 101, exclusive of the glass substrate 9, is about 1,050 micrometers. The glass substrate 9 corresponds to the substrate in the first to fifth aspects of the present invention, and the solid-state radiation detector 101, exclusive of the glass substrate 9, corresponds to the aforementioned selenium multilayer film.

The current detection unit 102 comprises a plurality of current detection amplifiers 21 respectively connected to the plurality of conductive elements 6a. The plurality of current detection amplifiers 21 concurrently detect currents which respectively flow in the plurality of conductive elements 6a when the solid-state radiation detector 101 is exposed to the reading light L2. The current detection unit 102 also comprises a connection unit 22 and a power supply 23. The connection unit 22 has two input terminals and an output terminal. The first electrode layer 2 in the solid-state radiation detector 101 is parallel-connected to one of the two input terminals of the connection unit 22 and a negative electrode of the power supply 23. The output terminal of the connection unit 22 is connected to the plurality of current detection amplifiers 21.

The LED array 103 is placed in the horizontal direction, and irradiates the solid-state radiation detector 101 with the reading light L2, which is approximately uniform and has a line-shaped cross section. The LED array 103 is moved by a scanning unit (not shown) in the longitudinal direction (as indicated by an arrow in FIG. 1) along the surface of the glass plate 9 in the solid-state radiation detector 101 so that the reading-side photoconductive layer 5 in the solid-state radiation detector 101 is scanned with the approximately uniform reading light L2.

Each of the recording-side photoconductive layer 3 and the reading-side photoconductive layer 5 is made of a photoconductive material containing a-Se (amorphous selenium) as a main component.

The operation suppressing unit 105 is connected to the thermistor 104 and the current detection unit 102. When the temperature detected by the thermistor 104 is lower than 0° C., or higher than 50° C., the operation suppressing unit 105 stops the operation of the current detection unit 102.

The operations of the radiographic-image pickup-and-readout system of FIG. 1 are explained below. First, the operations other than the temperature control operations are explained.

When a latent image is recorded in the solid-state radiation detector 101, first, the connection unit 22 is switched so that the connection unit 22 is connected to the power supply 23. Accordingly, a DC voltage is applied between the first electrode layer 2 and the plurality of conductive elements 6a in the second electrode layer 7 so that the first electrode layer 2 and the second electrode layer 7 are charged. Thus, a U-shaped electric field is formed between the first electrode layer 2 and each of the plurality of conductive elements 6a, where each of the plurality of conductive elements 6a is located at the bottom of the U shape.

Next, a patient 11 as a subject is irradiated with recording light L1 which is generated by the radiation source 10. The intensity distribution of recording light L1 is modified when the recording light L1 passes through the subject 11, so that the recording light L1 which has passed through the subject 11 carries radiographic image information on the subject 11. Therefore, the solid-state radiation detector 101 is exposed to the recording light L1 carrying the radiographic image information on the subject 11. The recording light L1 enters the wavelength conversion layer 1, which makes a wavelength conversion, i.e., converts the recording light L1 into the converted light (e.g., blue light). The converted light passes through the first electrode layer 2, and the recording-side photoconductive layer 3 is exposed to the converted light. When the recording-side photoconductive layer 3 is exposed to the converted light, the recording-side photoconductive layer 3 generates pairs of opposite charges (including latent-image charges), and exhibits conductivity. Then, negative charges out of the generated pairs of opposite charges move along the above electric field toward the plurality of conductive elements 6a, and are stored at the interface between the recording-side photoconductive layer 3 and the charge transport layer 4. The amount of the negative charges (i.e., the latent-image charges) stored at the interface between the recording-side photoconductive layer 3 and the charge transport layer 4 is approximately proportional to the exposure dose in the recording-side photoconductive layer 3, and therefore the latent-image charges stored at the interface between the recording-side photoconductive layer 3 and the charge transport layer 4 carry (or represent) an electrostatic latent image. Thus, the electrostatic latent image is recorded in the solid-state radiation detector 101. On the other hand, positive charges out of the generated pairs of opposite charges are attracted by the first electrode layer 2, and are then recombined with negative charges supplied from the power supply 23, i.e., vanish.

When the latent image is read out from the solid-state radiation detector 101, first, the connection unit 22 is connected to the first electrode layer 2 of the solid-state radiation detector 101.

Next, the line-shaped reading light L2 emitted from the LED array 103 passes though the glass substrate 9 and the second electrode layer 7, and enters the reading-side photoconductive layer 5. When the reading-side photoconductive layer 5 is exposed to the reading light L2, the reading-side photoconductive layer 5 generates pairs of opposite charges, and exhibits conductivity. Therefore, positive charges out of the pairs of opposite charges generated in the reading-side photoconductive layer 5 are attracted by the negative charges (latent-image charges) stored at the interface between the recording-side photoconductive layer 3 and the charge transport layer 4, rapidly move in the charge transport layer 4, and are then recombined with the negative charges (latent-image charges) at the interface between the recording-side photoconductive layer 3 and the charge transport layer 4, i.e., vanish. On the other hand, negative charges out of the pairs of opposite charges generated in the reading-side photoconductive layer 5 are recombined with positive charges supplied from the power supply 23 to the second electrode layer 7, i.e., vanish. That is, the negative charges (latent-image charges) stored in the solid-state radiation detector 101 vanish due to the charge recombination, and thus a current is generated in the solid-state radiation detector 101 by the above movement of the charges. The currents generated in a plurality of portions of the solid-state radiation detector 101 corresponding to a plurality of pixels arranged on each line across the plurality of conductive elements 6a are concurrently detected by the plurality of current detection amplifiers 21 when the plurality of portions of the solid-state radiation detector 101 on the line is exposed to the reading light L2. Since the currents which flow in the solid-state radiation detector 101 during the reading operation correspond to the latent-image charges representing the latent image, the latent image can be read out by detecting the above currents. As mentioned before, the LED array 103 is moved in the longitudinal direction (as indicated by the arrow in FIG. 1) along the surface of the glass plate 9 in the solid-state radiation detector 101 so that the entire area of the reading-side photoconductive layer 5 in the solid-state radiation detector 101 is scanned with the reading light L2.

In the second electrode layer 7, the striped electrode array 6 is comprised of the plurality of conductive elements 6a which are separated in the lateral direction, i.e., the direction of the length of the LED array 103. Therefore, the pixel pitch in the lateral direction is determined by the pitch of the striped electrode array 6. On the other hand, the pixel pitch in the longitudinal direction is determined by the switching period in the connection unit 22. Thus, information on the electrostatic latent image can be read out from the respectively predetermined pixel positions of the solid-state radiation detector 101 when the solid-state radiation detector 101 is scanned with the approximately uniform reading light L2.

In addition, since the recording-side photoconductive layer 3 is made of a photoconductive material containing a-Se (amorphous selenium) as a main component, the converted light (e.g., blue light) which has been generated in the wavelength conversion layer 1 by the wavelength conversion from the recording light L1 can be efficiently converted into latent-image charges, and stored as the latent-image charges. Further, since the reading-side photoconductive layer 5 is also made of a photoconductive material containing a-Se (amorphous selenium) as a main component, the recorded radiographic image information can be efficiently read out by scanning the reading-side photoconductive layer 5 with the reading light L2.

Next, the temperature control operations are explained below.

When the temperature of the solid-state radiation detector 101 is 0° C. or below, the matter of concern is the thermal stress caused between the reading-side photoconductive layer 5 and the glass substrate 9 since the second electrode layer 7 is basically a thin striped electrode.

When the reading-side photoconductive layer 5 is made of a-Se, and the temperature of the solid-state radiation detector 101 is 0° C. or below, it is considered that the thermal stress is caused between the reading-side photoconductive layer 5 and the glass substrate 9, since the thermal expansion coefficient of selenium is $3.68 \times 10^{-5}$/K at 40° C., and the thermal expansion coefficient of glass is, for example, $0.378 \times 10^{-5}$/K at 40° C. (in the case of a Corning 1737 glass plate having a thickness of 1.1 mm). Therefore, when the operation of the solid-state radiation detector 101 is suddenly started in a situation in which the temperature of the solid-state radiation detector 101 is 0° C. or below, a temperature difference is caused between the reading-side photoconductive layer 5 and the glass substrate 9, and the reading-side photoconductive layer 5 is likely to be separated from the glass substrate 9 by exfoliation.

On the other hand, when the temperature of the solid-state radiation detector 101 exceeds 50° C., the selenium film is softened, and the practical lifetime may be seriously reduced.

When the pickup-and-readout unit 100 is powered on, the operation suppressing unit 105 is immediately activated, and reads out from the thermistor 104 the temperature of the solid-state radiation detector 101. When the temperature of the solid-state radiation detector 101 detected by the thermistor 104 is 0° C. or below, the operation suppressing unit 105 suppresses the operation of the current detection unit 102.

When the pickup-and-readout unit 100 is powered on, the internal parts of the circuit generate heat, and the temperature of the solid-state radiation detector 101 increases with time. The operation suppressing unit 105 periodically reads out from the thermistor 104 the temperature of the solid-state radiation detector 101. When the temperature of the solid-state radiation detector 101 rises to 0° C., the operation suppressing unit 105 releases the suppression of the operation of the current detection unit 102. That is, when the temperature of the solid-state radiation detector 101 rises to 0° C., the normal operation of the pickup-and-readout unit 100 becomes possible.

The operation suppressing unit 105 also suppresses the operation of the current detection unit 102 when the temperature of the solid-state radiation detector 101 detected by the thermistor 104 exceeds 50° C. During the suppression of the operation, the temperature of the solid-state radiation detector 101 will gradually drop. Therefore, the operation suppressing unit 105 periodically reads out from the thermistor 104 the temperature of the solid-state radiation detector 101. When the temperature of the solid-state radiation detector 101 drops to 50° C. the operation suppressing unit 105 releases the suppression of the operation of the current detection unit 102. That is, when the temperature of the solid-state radiation detector 101 drops to 50° C., the normal operation of the pickup-and-readout unit 100 becomes possible.

The operation suppressing unit 105 continues the operation of periodically reading out the temperature of the solid-state radiation detector 101, and comparing the detected temperature with the upper and lower limits, and suppresses the operation of the current detection unit 102 when necessary.

Since the operation of the solid-state radiation detector 101 is suppressed when the temperature of the solid-state radiation detector 101 is outside the temperature range of 0° C. to 50° C., the solid-state radiation detector 101 can operate only in the temperature range of 0° C. to 50° C. In other words, the temperature of the solid-state radiation detector 101 can be maintained in a predetermined range during the image pickup and readout operations. Therefore, the serious decrease in the practical lifetime of the selenium detector due to softening or development of bulk crystallization of selenium in a high-temperature environment and the exfoliation of the selenium film from the substrate due to thermal stress caused by operation in a low-temperature environment can be prevented. Thus, the reliability of the radiographic-image pickup-and-readout system of FIG. 1 can be improved.

The above temperature range of 0° C. to 50° C. can be reduced to a range of 10° C. to 45° C. In this case, the decrease in the practical lifetime of the selenium detector can be further effectively suppressed, and the exfoliation of the selenium film from the substrate can be further effectively prevented.

Second Embodiment

Figure 3:
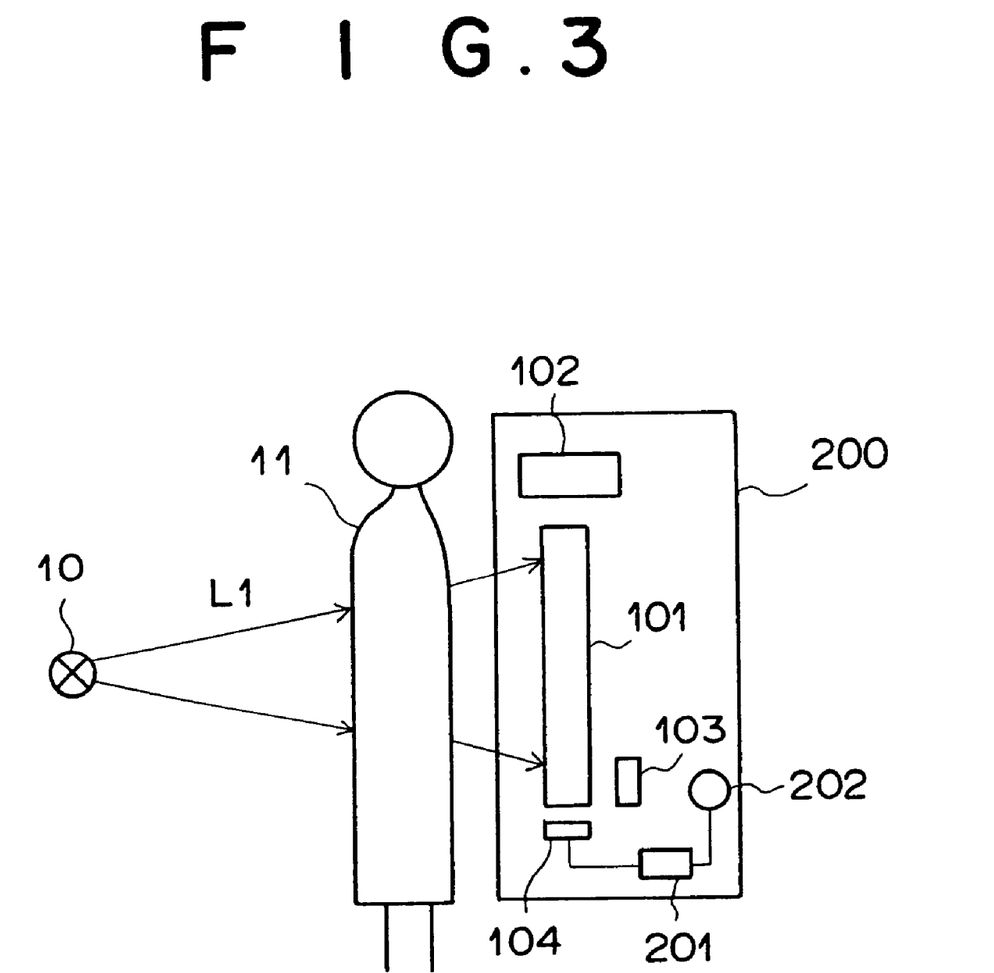
FIG. 3 is a diagram illustrating an outline of a radiographic-image pickup-and-readout system using an energetic-beam detection apparatus as a second embodiment of the present invention.

FIG. 3 is a diagram illustrating an outline of a radiographic-image pickup-and-readout system using an energetic-beam detection apparatus as the second embodiment of the present invention. In FIG. 3, elements having the same reference numbers as FIG. 1 have the same functions as the corresponding elements in FIG. 1, and the detailed explanations of the same elements as FIG. 1 are not repeated.

The radiographic-image pickup and readout system of FIG. 3 comprises a radiation source 10 and a pickup-and-readout apparatus 200 as the above energetic-beam detection apparatus. The pickup-and-readout apparatus 200 comprises a solid-state radiation detector 101, a current detection unit 102, an LED array 103, a thermistor 104, a notification control unit 201, and an alarm unit 202. The solid-state radiation detector 101 is a flat-panel type selenium detector. The current detection unit 102 reads out image information from the solid-state radiation detector 101 as a current value. The LED array 103 scans the solid-state radiation detector 101 with reading light for exposing the solid-state radiation detector 101 to the reading light. The thermistor 104 detects the temperature of the solid-state radiation detector 101. The notification control unit 201 and the alarm unit 202 realize the aforementioned notification unit in the energetic-beam detection apparatus according to the fourth aspect of the present invention.

The notification control unit 201 is connected to the thermistor 104 and the alarm unit 202, and reads out from the thermistor 104 the temperature of the solid-state radiation detector 101 at predetermined intervals. When the temperature of the solid-state radiation detector 101 detected by the thermistor 104 is lower than 10° C., or higher than 45° C., the notification control unit 201 activates the alarm unit 202 in order to notify the drop of the temperature of the solid-state radiation detector 101 below 10° C. or rise of the temperature of the solid-state radiation detector 101 above 45° C.

When the temperature of the solid-state radiation detector 101 exceeds 45° C., the development of bulk crystallization of selenium is accelerated, the dark resistance characteristic deteriorates, and the practical lifetime of the selenium detector decreases. That is, the rise of the temperature of the solid-state radiation detector 101 above 45° C. is not desirable. Therefore, in this case, the notification control unit 201 notifies the user of the rise of the temperature of the solid-state radiation detector 101 above 45° C. in order to prompt the user to take appropriate measures against the temperature rise.

On the other hand, even when the temperature of the solid-state radiation detector 101 drops below 10° C., the solid-state radiation detector 101 is still usable at the temperature. However, it is not desirable to use the solid-state radiation detector 101 at such a low temperature. Therefore, in this case, the notification control unit 201 also notifies the user of the drop of the temperature of the solid-state radiation detector 101 below 10° C.

As explained above, when the temperature of the solid-state radiation detector 101 is outside the range of 10° C. to 45° C., the user is notified of the deviation of the temperature from the predetermined range. Therefore, the user can take appropriate measures against the deviation of the temperature from the predetermined range. Thus, it is possible to prevent the decrease in the practical lifetime of the selenium detector due to softening or development of bulk crystallization of selenium in a high-temperature environment, and exfoliation of the energetic-beam absorber (selenium multilayer film) from the substrate due to thermal stress caused by operation in a low-temperature environment. When the deviation of the temperature of the selenium detector from the predetermined range is corrected by the above measures, the user can continuously use the pickup-and-readout unit 200 without stopping the operation of the pickup-and-readout unit 200. Therefore, the usability of the radiographic-image pickup-and-readout system of FIG. 3 is improved by the provision of the notification unit realized by the notification control unit 201 and the alarm unit 202.

Alternatively, the above temperature range may be extended to a range of 0° C. to 50° C. In this case, the user can also take appropriate measures against the deviation of the temperature from this temperature range, and prevent serious decrease in the practical lifetime of the selenium detector due to softening or development of bulk crystallization of selenium in a high-temperature environment, and exfoliation of the energetic-beam absorber (selenium multilayer film) from the substrate due to thermal stress caused by operation in a low-temperature environment. Since the temperature range is extended, the frequency of activation of the alarm decreases, and the user can be relieved from frequent alarm activations.

Third Embodiment

Figure 4:
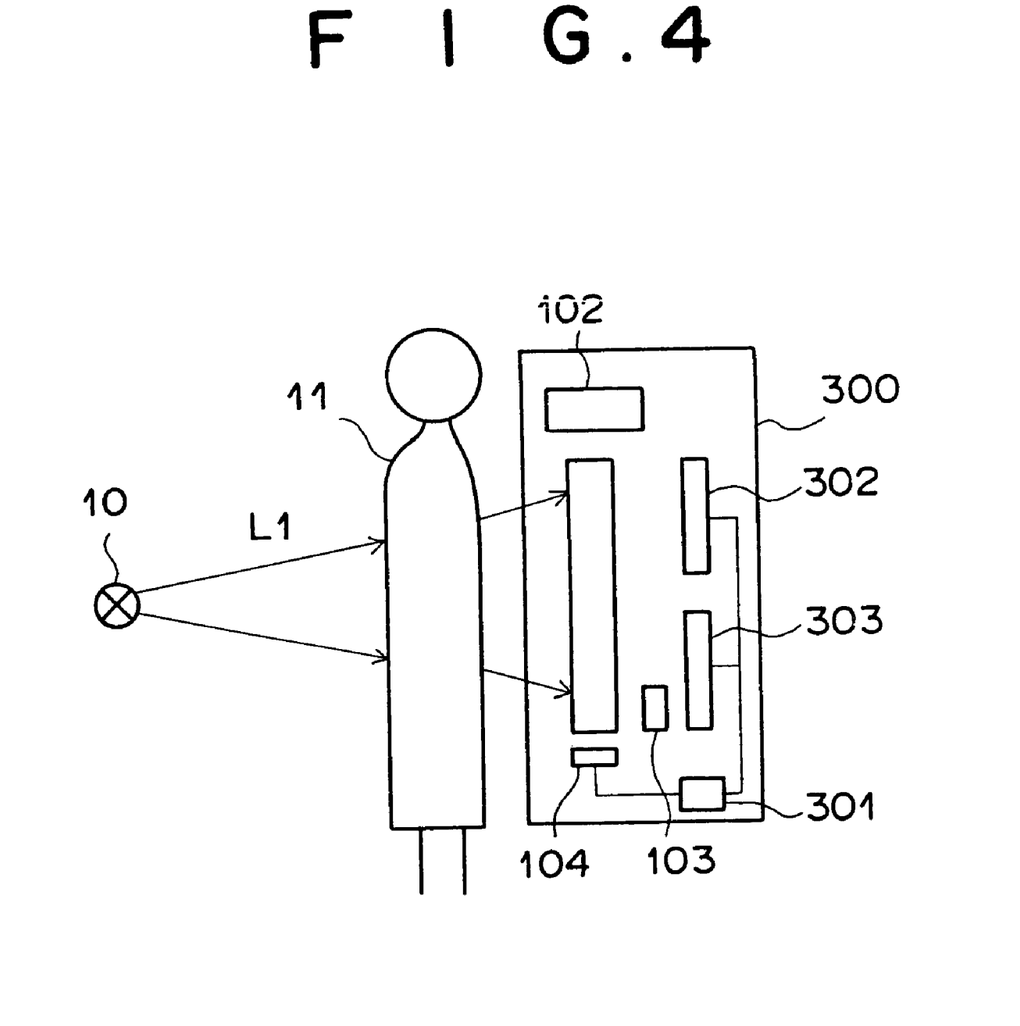
FIG. 4 is a diagram illustrating an outline of a radiographic-image pickup-and-readout system using an energetic-beam detection apparatus as a third embodiment of the present invention.

FIG. 4 is a diagram illustrating an outline of a radiographic-image pickup-and-readout system using an energetic-beam detection apparatus as the third embodiment of the present invention. In FIG. 4, elements having the same reference numbers as FIG. 1 have the same functions as the corresponding elements in FIG. 1, and the detailed explanations of the same elements as FIG. 1 are not repeated.

The radiographic-image pickup and readout system of FIG. 4 comprises a radiation source 10 and a pickup-and-readout apparatus 300 as the above energetic-beam detection apparatus. The pickup-and-readout apparatus 300 comprises a solid-state radiation detector 101, a current detection unit 102, an LED array 103, a thermistor 104, a temperature control unit 301, a heater 302, and a fan 303. The solid-state radiation detector 101 is a flat-panel type selenium detector. The current detection unit 102 reads out image information from the solid-state radiation detector 101 as a current value. The LED array 103 scans the solid-state radiation detector 101 with reading light for exposing the solid-state radiation detector 101 to the reading light. The thermistor 104 detects the temperature of the solid-state radiation detector 101. The heater 302 realizes the aforementioned heating unit in the energetic-beam detection apparatus according to the fifth aspect of the present invention, and the fan 303 realizes the aforementioned cooling unit in the energetic-beam detection apparatus according to the fifth aspect of the present invention.

The temperature control unit 301 is connected to the thermistor 104, the heater 302, and the fan 303, reads out from the thermistor 104 the temperature of the solid-state radiation detector 101 at predetermined intervals, and activates the heater 302 or the fan 303 according to the temperature of the solid-state radiation detector 101 detected by the thermistor 104. The temperature control unit 301 and the heater 302 realize the aforementioned high-side temperature control unit in the fifth aspect of the present invention, and the temperature control unit 301 and the fan 303 realize the aforementioned low-side temperature control unit in the fifth aspect of the present invention.

Figure 5:
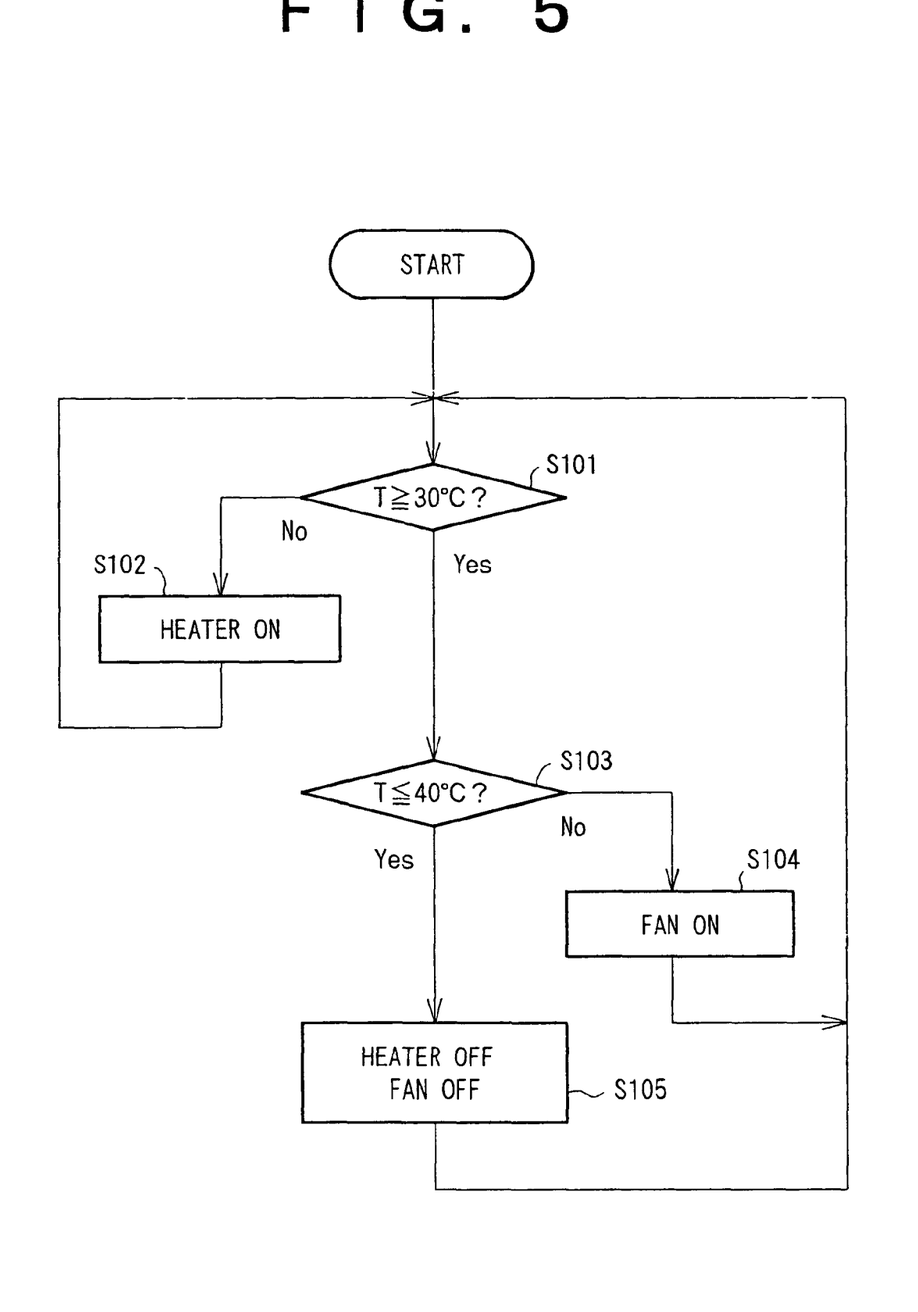
FIG. 5 is a flow diagram of the operations of the temperature control unit in the third embodiment of the present invention.

The operations of the temperature control unit 301 are explained below with reference to FIG. 5, which is a flow diagram of the operations of the temperature control unit 301 in the third embodiment of the present invention.

When the pickup-and-readout apparatus 300 is powered on, in step S101, the temperature control unit 301 reads out the temperature T of the solid-state radiation detector 101 from the thermistor 104, and determines whether or not the temperature T is equal to or greater than 30° C. When yes is determined in step S101, the operation goes to step S103. When no is determined in step S101, the operation goes to step S102.

In step S102, the temperature control unit 301 determines whether or not the heater 302 is activated. When yes is determined in step S102, the temperature control unit 301 activates the heater 302, and then the operation goes back to step S101. When no is determined in step S102, the operation goes back to step S101. In step S101, the temperature control unit 301 repeats, at predetermined intervals, the above operations of reading out the temperature T of the solid-state radiation detector 101 from the thermistor 104, and determining whether or not the temperature T is equal to or greater than 30° C.

In step S103, the temperature control unit 301 determines whether or not the temperature T is equal to or smaller than 40° C. When yes is determined in step S103, the operation goes to step S105. When no is determined in step S103, the operation goes to step S104.

In step S104, the temperature control unit 301 determines whether or not the fan 303 is activated. When yes is determined in step S104, the operation goes back to step S101. When no is determined in step S104, the temperature control unit 301 activates the fan 303, and then the operation goes back to step S101.

In step S105, the temperature control unit 301 determines whether or not the heater 302 or the fan 303 is activated. When yes is determined in step S105, the temperature control unit 301 stops the heater 302 or the fan 303, and then the operation goes back to step S101. When the temperature control unit 301 determines that neither of the heater 302 and the fan 303 is activated, the operation goes back to step S101.

According to the above sequence of operations, when the operation of the solid-state radiation detector 101 is started, the temperature control unit 301 first activates the heater 302, since it is considered that the temperature T of the solid-state radiation detector 101 is often lower than 30° C. when the solid-state radiation detector 101 is powered on. Thereafter, when the temperature T of the solid-state radiation detector 101 rises to 30° C., the operation goes to step S103. Since, at this time, the temperature T is near 30° C., the operation goes to step S105, in which the heater 302 is stopped, and then the operation goes back to step S101. In the case where the ambient temperature is low, the temperature T of the solid-state radiation detector 101 may drop below 30° C. again. However, usually, the temperature T of the solid-state radiation detector 101 is maintained equal to or above 30° C. due to heat generated by operation of the solid-state radiation detector 101, and therefore the operations in steps S101, S103, and S105 are repeated at predetermined intervals. On the other hand, in the case where the ambient temperature is high, the temperature T of the solid-state radiation detector 101 may rise above 40° C. In this case, the operation goes to step S104, in which the fan 303 is activated so as to cool the solid-state radiation detector 101. Thereafter, when the temperature T of the solid-state radiation detector 101 drops below 40° C., the operation goes to step S105, in which the fan 303 is stopped. Therefore, in the case where the ambient temperature is high, often, the fan 303 is repeatedly activated and stopped.

As explained above, in the radiographic-image pickup-and-readout system of FIG. 4, the temperature T of the solid-state radiation detector 101 is controlled by using the heater 302 and the fan 303 so as to be maintained in the range of 30° C. to 40° C. Therefore, even when the temperature T of the solid-state radiation detector 101 deviates from the above range, the deviation from the range can be corrected in a short time. Thus, it is possible to effectively prevent the decrease in the practical lifetime of the selenium detector due to softening or development of bulk crystallization of selenium in a high-temperature environment, and exfoliation of the energetic-beam absorber (selenium multilayer film) from the substrate due to thermal stress caused by operation in a low-temperature environment. In addition, the user can continuously use the pickup-and-readout unit 300 without stopping the operation of the pickup-and-readout unit 300. As a result, the usability of the radiographic-image pickup-and-readout system of FIG. 4 is further improved by the provision of the temperature control unit 301, the heater 302, and the fan 303.

In addition, since the temperature of the solid-state radiation detector 101 is maintained within the range of 30° C. to 40° C., the solid-state radiation detector 101 can be used in the temperature range in which the detection sensitivity is high. Therefore, the detection sensitivity of the solid-state radiation detector 101 is improved.

Since the heater 302 and the fan 303 are used, the temperature of the solid-state radiation detector 101 can be easily controlled within a desired temperature range.

In a variation of the pickup-and-readout apparatus 300 as the third embodiment of the present invention, the lower limit of the above temperature range may be 0° C. or 10° C., and the upper limit of the above temperature range may be 45° C. or 50° C.

Another variation of the pickup-and-readout apparatus 300 as the third embodiment of the present invention does not comprise the heater 302, and the temperature is controlled by using only the temperature control unit 301 and the fan 303. In this case, when the temperature of the solid-state radiation detector 101 is low at the time at which the pickup-and-readout apparatus 300 is powered on, it takes a relatively long time for the temperature T of the solid-state radiation detector 101 to rise to the lower limit of the above temperature range. However, it is advantageous that the cost and the size can be reduced since the solid-state radiation detector 101 does not comprise the heater 302.

Variations and Other Matters (i) Since the pickup-and-readout apparatuses 100, 200, and 300 as the first, second, and third embodiments of the present invention are designed for breast X-ray imaging, the selenium detectors comprising a selenium multilayer film being formed on a glass substrate and having a thickness of 1,050 message are used. However, when the energetic beam to be detected by the selenium detector has relatively low energy, a selenium multilayer film having a smaller thickness can be used. For example, it is sufficient for a selenium detector used in mammography to have a thickness of about 150 micrometers. However, when the thickness of the selenium multilayer film exceeds 150 micrometers, exfoliation of the selenium multilayer film from the substrate may be caused by a difference in the thermal expansion coefficient between the selenium multilayer film and the substrate. Therefore, even when the thickness of the selenium multilayer film is reduced, the present invention is advantageous.

(ii) Although the above descriptions are provided for the preferred embodiments of the present invention, the scope of the present invention is not limited to such embodiments. Various modifications and changes are possible within the scope of the invention.

For example, the charge generation process in the selenium detector, by which the latent-image charges carrying the radiographic image information are generated, is not limited to the combination of the optical conversion process and the direct conversion process, which is used in the first, second, and third embodiments. Alternatively, each of the optical conversion process and the direct conversion process can be used alone as the charge generation process in the selenium detector. Further, any other charge generation process, including an improved optical conversion process and an improved direct conversion process, can be used.

In addition, the charge readout process is not limited to the optical readout process, which is used in the first, second, and third embodiments. Alternatively, any other charge readout process including the TFT readout process disclosed in the coassigned U.S. patent application Ser. No. 09/385,443 corresponding to Japanese Unexamined Patent Publication No. 2000-137080, an improved optical readout process, and an improved TFT readout process can be used as the charge readout process.

What is claimed is:

1. A method for controlling temperature in an energetic-beam detection apparatus including a selenium detector which includes a substrate and an energetic-beam absorber being formed on the substrate and containing selenium; said method comprising the steps of:

(a) detecting a temperature of said selenium detector; and
   (b) controlling said temperature of the selenium detector so that the temperature is maintained in a range of 0° C. to 50° C. when said selenium detector is in operation.

2. A method according to claim 1, wherein in said step (b), said temperature is maintained in a range of 10° C. to 45° C. when said selenium detector is in operation.

3. A method according to claim 1, wherein in said step (b), said temperature is maintained in a range of 30° C. to 40° C. when said selenium detector is in operation.

4. An energetic-beam detection apparatus comprising:
   a selenium detector which includes a substrate and an energetic-beam absorber being formed on the substrate and containing selenium;
   a temperature detecting unit which detects a temperature of said selenium detector; and
   a temperature control unit which controls said temperature of the selenium detector so that the temperature is maintained in a predetermined range when said selenium detector is in operation.

5. An energetic-beam detection apparatus according to claim 4, wherein said predetermined range is from 0° C. to 50° C.

6. An energetic-beam detection apparatus according to claim 4, wherein said predetermined range is from 10° C. to 45° C.

7. An energetic-beam detection apparatus according to claim 4, wherein said energetic-beam absorber is realized by a selenium multilayer film having a thickness of 150 to 1,500 micrometers.

8. An energetic-beam detection apparatus comprising:

a selenium detector which includes a substrate and an energetic-beam absorber being formed on the substrate and containing selenium;

a temperature detecting unit which detects a temperature of said selenium detector; and an operation suppressing unit which suppresses operation of said selenium detector when said temperature of the selenium detector is outside a predetermined range.

9. An energetic-beam detection apparatus according to claim 8, wherein said predetermined range is from 0° C. to 50° C.

10. An energetic-beam detection apparatus according to claim 8, wherein said predetermined range is from 10° C. to 45° C.

11. An energetic-beam detection apparatus according to claim 8, wherein said energetic-beam absorber is realized by a selenium multilayer film having a thickness of 150 to 1,500 micrometers.

12. An energetic-beam detection apparatus comprising:

a selenium detector which includes a substrate and an energetic-beam absorber being formed on the substrate and containing selenium;

a temperature detecting unit which detects a temperature of said selenium detector; and a notification unit which notifies a user of deviation of said temperature of the selenium detector from a predetermined range when said temperature of the selenium detector is outside the predetermined range.

13. An energetic-beam detection apparatus according to claim 12, wherein said predetermined range is from 0° C. to 50° C.

14. An energetic-beam detection apparatus according to claim 12, wherein said predetermined range is from 10° C. to 45° C.

15. An energetic-beam detection apparatus according to claim 12, wherein said energetic-beam absorber is realized by a selenium multilayer film having a thickness of 150 to 1,500 micrometers.

16. An energetic-beam detection apparatus comprising:

a selenium detector which includes a substrate and an energetic-beam absorber being formed on the substrate and containing selenium;

a temperature detecting unit which detects a temperature of said selenium detector; and a high-side temperature control unit which controls said temperature of the selenium detector so that the temperature is maintained equal to or below a predetermined upper limit.

17. An energetic-beam detection apparatus according to claim 16, further comprising a low-side temperature control unit which controls said temperature of the selenium detector so that the temperature is maintained equal to or above a predetermined lower limit.

18. An energetic-beam detection apparatus according to claim 16, wherein said predetermined upper limit is one of 40° C., 45° C., and 50° C.

19. An energetic-beam detection apparatus according to claim 17, wherein said predetermined lower limit is one of 0° C., 10° C., and 30° C.

20. An energetic-beam detection apparatus according to claim 17, wherein said predetermined upper limit is 40° C., and said predetermined lower limit is 30° C.

21. An energetic-beam detection apparatus according to claim 16, wherein said high-side temperature control unit comprises a cooling unit which cools said selenium detector.

22. An energetic-beam detection apparatus according to claim 17, wherein said low-side temperature control unit comprises a warming unit which warms said selenium detector.

23. An energetic-beam detection apparatus according to claim 16, wherein said energetic-beam absorber is realized by a selenium multilayer film having a thickness of 150 to 1,500 micrometers.

* * * * *